(12) United States Patent
Daikokuya et al.

(10) Patent No.: US 10,611,410 B2
(45) Date of Patent: Apr. 7, 2020

(54) FRONT CHASSIS STRUCTURE FOR AUTOMOBILE

(71) Applicants: Y-TEC CORPORATION, Hiroshima (JP); MAZDA MOTOR CORPORATION, Hiroshima (JP)

(72) Inventors: Tomohisa Daikokuya, Hiroshima (JP); Yasunari Jinbo, Aki-gun (JP); Katsuyuki Komiya, Hiroshima (JP); Yoko Takanashi, Hiroshima (JP)

(73) Assignees: Y-TEC CORPORATION, Hiroshima (JP); MAZDA MOTOR CORPORATION, Hiroshima (JP)

( * ) Notice: Subject to any disclaimer, the term of this patent is extended or adjusted under 35 U.S.C. 154(b) by 138 days.

(21) Appl. No.: 15/906,140

(22) Filed: Feb. 27, 2018

(65) Prior Publication Data

US 2018/0281863 A1    Oct. 4, 2018

(30) Foreign Application Priority Data

Mar. 28, 2017  (JP) ................................. 2017-063125

(51) Int. Cl.
| | |
|---|---|
| *B62D 21/15* | (2006.01) |
| *B62D 27/02* | (2006.01) |
| *B60R 19/34* | (2006.01) |
| *B62D 21/11* | (2006.01) |

(52) U.S. Cl.
CPC ............ *B62D 21/152* (2013.01); *B62D 21/11* (2013.01); *B62D 21/155* (2013.01); *B62D 27/023* (2013.01); *B60R 19/34* (2013.01)

(58) Field of Classification Search
CPC .... B62D 21/152; B62D 27/023; B62D 21/11; B62D 21/155; B60R 19/23; B60R 19/34

USPC ....................................................... 296/187.1
See application file for complete search history.

(56) References Cited

U.S. PATENT DOCUMENTS

| | | | |
|---|---|---|---|
| 2012/0086225 A1* | 4/2012 | Matsuura ................ | B60R 19/34 293/132 |
| 2013/0256051 A1 | 10/2013 | Nakamura et al. | |
| 2016/0046250 A1* | 2/2016 | Sotoyama ............ | B62D 21/152 293/155 |

FOREIGN PATENT DOCUMENTS

| | | |
|---|---|---|
| JP | 2013-215757 A | 10/2013 |
| JP | 2015-231781 A | 12/2015 |

\* cited by examiner

*Primary Examiner* — Joseph D. Pape
*Assistant Examiner* — Dana D Ivey
(74) *Attorney, Agent, or Firm* — Studebaker & Brackett PC (57) ABSTRACT

The present application discloses front chassis structure including set plate to which impact absorber is connected. Front chassis structure includes: pillar member having inner support plate portion for supporting impact absorber, outer support plate portion for supporting impact absorber in cooperation with inner support portion, and pillar portion having horizontal cross-section bulging rearward from inner and outer support plate portions; connection member for connecting pillar portion to vehicle body; front side member extending rearward from pillar member; and projecting member projecting outward from pillar member. Set plate is mounted on the outer and inner support plate portions. Projecting member includes front end covered by outer support plate portion. Projecting member is connected to front side member so that projecting member presses front side member inward under moment around connection member, moment being generated at collision of automobile.

20 Claims, 6 Drawing Sheets

FRONT CHASSIS STRUCTURE FOR AUTOMOBILE

TECHNICAL FIELD

The present invention relates to a front chassis structure for an automobile.

BACKGROUND ART

A sub-frame for supporting a suspension arm may be situated below a main frame which forms a part of a vehicle body (c.f. JP 2015-231781 A). The sub-frame disclosed in JP 2015-231781 A includes a pillar member, a set plate and a crash can. The crash can is fixed to the set plate and extends forward from the set plate. When there is a collision of an automobile, the crash can is compressively deformed to absorb an impact force acting on the automobile.

The pillar member includes two attachment plate portions and a pillar portion. The attachment plate portion on the left side is away from the attachment plate portion on the right side. The pillar portion is formed by a thin plate having a horizontal cross-section bulging rearward from the left and right attachment plate portions. The pillar portion extends in the vertical direction. The pillar portion is connected to a vehicle body situated above the sub-frame. The aforementioned set plate is connected to the left and right attachment plate portions by screws. Since the pillar portion has a horizontal cross-section bulging rearward from the left and right attachment plate portions, the pillar portion may have a high rigidity. Since the crash can is connected to the highly rigid portion, only the crash can is compressively deformed so that portions situated on the rear side of the crash can are less likely to be damaged when an impact force is not so large. Since the set plate is connected to the left and right attachment plate portions by screws, deformation which may move the left and right attachment portions toward or away from each other is less likely to occur. Therefore, the pillar member may receive a large impact force with little deformation.

When collusion occurs in a portion outside a position where the crash can is situated, the automobile designed on the basis of the techniques disclosed in JP 2015-231781 A hardly causes deformation of the crash can. Consequently, an impact force may be transmitted to a cabin without substantial reduction.

JP 2013-212757 A proposes techniques for preventing transmission of an impact force to a cabin, the impact force being caused by collision outside a position where a crash can is situated. A sub-frame disclosed in JP 2013-212757 A includes a crash can, two set plates, a front side member and a projecting member. The crash can is fixed to one of the two set plates (hereinafter, referred to as "first set plate"). The other of the two set plates (hereinafter, referred to as "second set plate") is fixed to a front end of the front side member. The second set plate is situated on the rear side of the first set plate so as to overlap the first set plate.

The front side member extends rearward from the second set plate. The projecting member projects outward in the vehicle width direction from the front side member. The second set plate extends outward in the vehicle width direction from the first set plate to cover a front end of the projecting member.

A collision object colliding with the automobile outside the crash can hits with the second set plate which forms a flat plane in front of the projecting member. An impact force is then, transmitted from the second set plate to the projecting member. The impact force transmitted to the projecting member acts as a force for bending the front side member. As a result of bending the front side member, the impact force is alleviated. Therefore, the cabin is appropriately protected from the impact force.

When the techniques disclosed in JP 2015-231781 A and JP 2013-212757 A are combined, a sub-frame may protect a cabin from various impacts. However, combining the techniques disclosed in JP 2015-231781 A and JP 2013-212757 A requires a set plate, to which a crash can is fixed, and a set plate for covering a front end of a projecting member. In this case, it is necessary to join these set plates and to join the set plate for covering the front end of the projecting member to a pillar member. As a result of forming many joining portions, it becomes cumbersome to manufacture the sub-frame.

When joining all members including two set plates, a pillar member, a projecting member and a crash can depends on welding techniques, it is necessary to weld these members at respective joining positions with high reliability. This means that well-skilled welding techniques are required. In addition, when there is inappropriate connection of a set plate to a pillar member, an impact force transmitted to the projecting member may not be effectively used in bending a front side member.

An object of the present invention is to provide a front chassis structure configured to protect a cabin from various impacts, the front chassis structure being easily manufactured.

SUMMARY OF INVENTION

A front chassis structure according to one aspect of the present invention includes an impact absorber for absorbing an impact force and a set plate connected to the impact absorber. The front chassis structure includes; a pillar member including an inner support plate portion, on which the set plate is attached to support the impact absorber, an outer support plate portion, on which the set plate is attached to support the impact absorber at a position away outward in a vehicle width direction of the automobile from the inner support plate portion, and a pillar portion having a horizontal cross-section bulging rearward from the inner and outer support plate portions, the pillar portion extending in a vertical direction; a connection member attached to an upper end of the pillar portion and connected to a vehicle body above the front chassis structure; a front side member extending rearward from the pillar member; and a projecting member connected to the pillar member and projecting outward in the vehicle width direction from the pillar member. The projecting member includes a front end covered by the outer support plate portion. The projecting member is connected to the front side member so that the projecting member presses the front side member inward in the vehicle width direction when there is a moment around the connection member, the moment being generated when the projecting member collides with a collision object which collides with the automobile.

The aforementioned front chassis structure protects a cabin from various impacts and is easily manufactured.

These and other objects, features and advantages of the aforementioned front chassis structure will become more apparent, upon reading the following detailed description along with the accompanying drawings.

DESCRIPTION OF EMBODIMENTS

Figure 1:
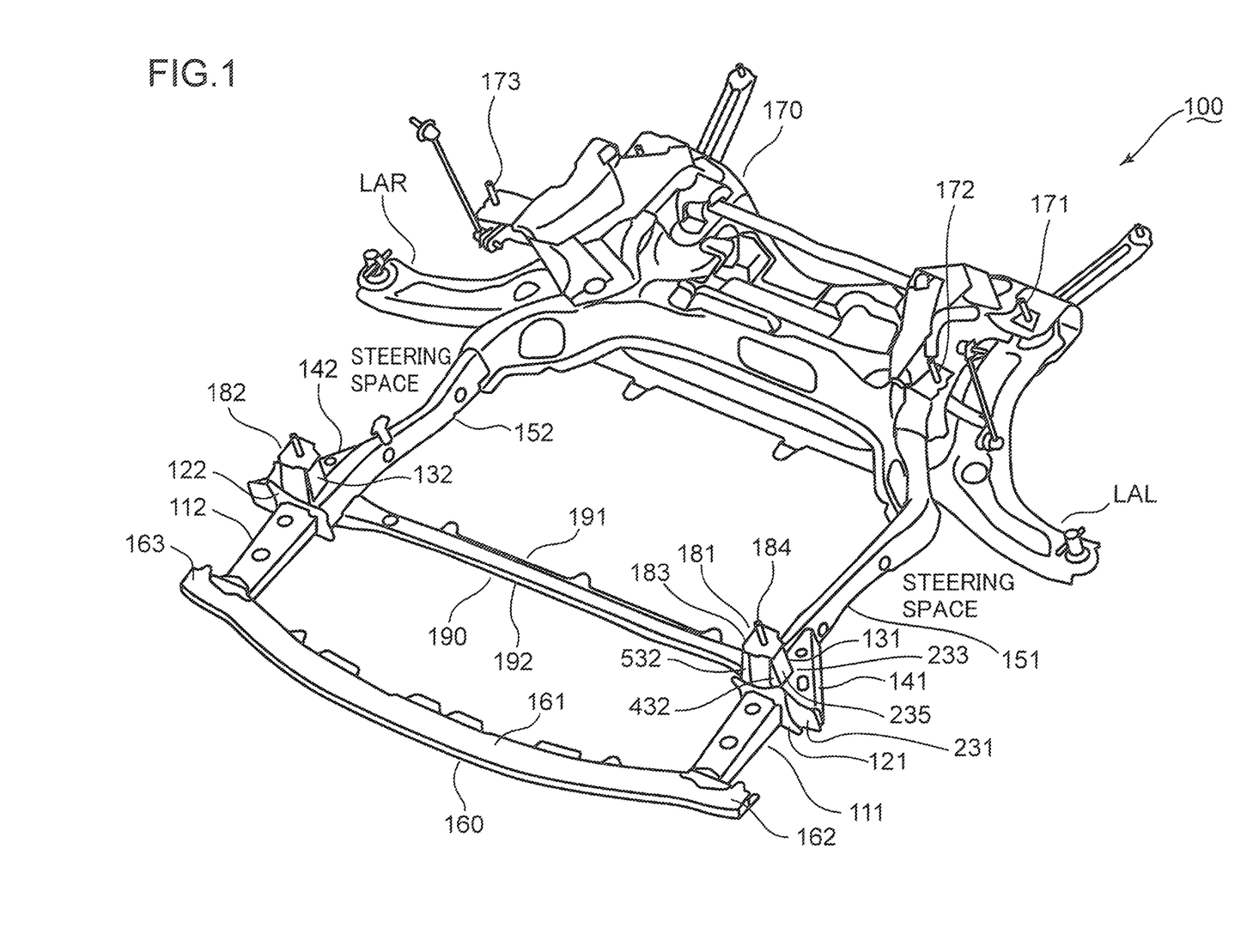
FIG. 1 is a schematic perspective view of a sub-frame exemplified as the front, chassis structure.

FIG. 1 is a schematic perspective view of a sub-frame 100 exemplified as the front chassis structure for an automobile. The sub-frame 100 is described with reference to FIG. 1.

The sub-frame 100 has a bilaterally symmetrical structure. A left structure of the sub-frame 100 is mainly described. The description about the left structure of the sub-frame 100 is applied to a right structure of the sub-frame 100.

With regard to the left side structure, the terra "left" means an outer side in the vehicle width direction. The term "right" means an inner side in the vehicle width direction. As described above, since the sub-frame 100 has a bilaterally symmetrical structure, with regard to the right structure of the sub-frame 100, the outer side in the vehicle width direction is "right" whereas the inner side in the vehicle width direction is "left".

The sub-frame 100 includes two crash cans 111, 112, two set plates 121, 122, two pillar: members 131, 132, two projecting members 141, 142, two front side members 151, 152, a bumper beam 160, a support structure 170 and two connection members 181, 182. FIG. 1 shows two lower arms LAL, LAR. The support structure 170 supports the two lower arms LAL, LAR. The lower arm LAL on the left side is connected to the left front wheel (not shown). The lower arm LAR on the right side is connected to the right front wheel (not shown).

The front side members 151, 152 extend from the support, structure 170, and are respectively connected to the pillar members 131, 132. The front side member 151 is situated on the left of the front side member 152. The pillar member 131 is situated on the left of the pillar member 132. A space on the left of the front side member 151 is used as a steering space for changing a direction of the left front wheel. The front side member 151 forms a boundary of the steering space for the left front wheel. A space on the right of the front side member 152 is used as a steering space for changing a direction of the right front wheel. The front side member 152 forms a boundary of the steering space for the right front wheel.

The left projecting member 141 is connected to the front side member 151 and the pillar member 131. The projecting member 141 projects leftward from the front side member 151 and the pillar member 131. The right projecting member 142 is connected to the front side member 152 and the pillar member 132. The projecting member 142 projects rightward from the front side member 152 and the pillar member 132.

The left pillar member 131 is situated between the front side member 151 and the set plate 121. The pillar member 131 projects upward from the front side member 151, the set plate 121 and the projecting member 141. The connection member 181 is attached to an upper end of the pillar member 131, and is connected to a vehicle body (not shown) situated above the sub-frame 100. A lower portion of the pillar member 131 is surrounded by the front side member 151, the set plate 121 and the projecting member 141.

The right pillar: member 132 is situated between the front side member 152 and the set plate 122. The pillar member 132 projects upward from the front side member 152, the set plate 122 and the projecting member 142. The connection member 182 is attached to an upper end of the pillar member 132, and is connected to the vehicle body (not shown) situated above the sub-frame 100. A lower portion of the pillar member 132 is surrounded by the front side member 152, the set plate 122 and the projecting member 142.

A rear end of the crash can 111 is connected to the set plate 121. The set plate 121 is connected to the pillar member 131. Therefore, the crash can 111 is attached to the pillar member 131 via the set plate 121. A front end of the crash can 111 is connected to the vicinity of a left end of the bumper beam 160.

A rear end of the crash can 112 is connected to the set plate 122. The set plate 122 is connected to the pillar member 132. Therefore, the crash can 112 is attached to the pillar member 132 via the set plate 122. A front end of the crash can 112 is connected to the vicinity of a right end of the bumper beam 160.

When the automobile collides with an object at a portion between the crash cans 111, 112, the crash cans 111, 112 are compressively deformed to absorb an impact force. An impact force which fails to be absorbed by the crash cans 111, 112 is transmitted to the front side members 151, 152 through the pillar members 131, 132. With regard to the present embodiment, the impact absorber is exemplified by the crash cans 111, 112. With regard to the present embodiment, the crash cans 111, 112 are connected to the pillar members 131, 132 via the set plates 121, 122. However, the impact absorber may have an impact absorbing structure integrally formed with the pillar members 131, 132. The principles of the present embodiment are not limited to a specific structure of the impact absorber.

Since each of the front side members 151, 152 is a hollow rod extending straight as a whole, the front, side members 151, 152 are less likely to be deformed even when an impact force is transmitted. The impact force is transmitted to the support, structure 170 through the front side members 151, 152.

The support structure 170 includes connection pins 171, 172, 173. The support structure 170 is connected to the vehicle body situated above the sub-frame 100 via the connection pins 171, 172, 173.

The support structure 170 is the most rigid in the sub-frame 100. Therefore, an impact force transmitted to the support structure 170 is transmitted to the connection pins 171, 172, 173 substantially without being absorbed by the support, structure 170. Consequently, the connection pins 171, 172, 173 are broken or damaged, so that the sub-frame 100 is separated from the vehicle body. Therefore, the impact force acting on the sub-frame 100 is less likely to be transmitted to the cabin (not shown).

A horizontal cross-section of each of the pillar member 131, 132 not only has a predetermined width in the vehicle width direction but also a predetermined length in a rearward direction from the set plate 121, 122. Therefore, the pillar members 131, 132 provide a high rigidity to attachment portions of the crash cans 111, 112. When an impact force acting on the bumper beam 160 between the crash cans 111, 112 is not so large, only the crash cans 111, 112 are compressively deformed, so that other portions (e.g. the pillar members 131, 132, the front side members 151, 152 and/or the projecting members 141, 142) are less likely to be deformed.

A small overlap (SOL) collision means that, a left end of the bumper beam 160 (i.e. a portion on the left of the crash can 111) or a right end of the bumper bean 160 (i.e. a portion on the right of the crash can 112) collides with an object. The SOL collision hardly generates compressive deformation of the crash cans 111, 112. In this case, the object collides with one of the projecting members 141, 142.

The projecting member 141 is connected to an outer lateral surface of the front side member 151. Therefore, an impact force caused by collision of the object against the projecting member 141 acts on the outer lateral surface of the front side member 151. Consequently, the front side member 151 is bent rightward or broken by the impact force. Therefore, the impact force is less likely to be transmitted to the cabin.

The projecting member 142 is connected to an outer lateral surface of the front side member 152. Therefore, an impact force caused by collision of an object against the projecting member 142 acts on the outer lateral surface of the front side member 152. Consequently, the front side member 152 is bent leftward or is broken by the impact force. Therefore, the impact force is less likely to be transmitted to the cabin.

Figure 2:
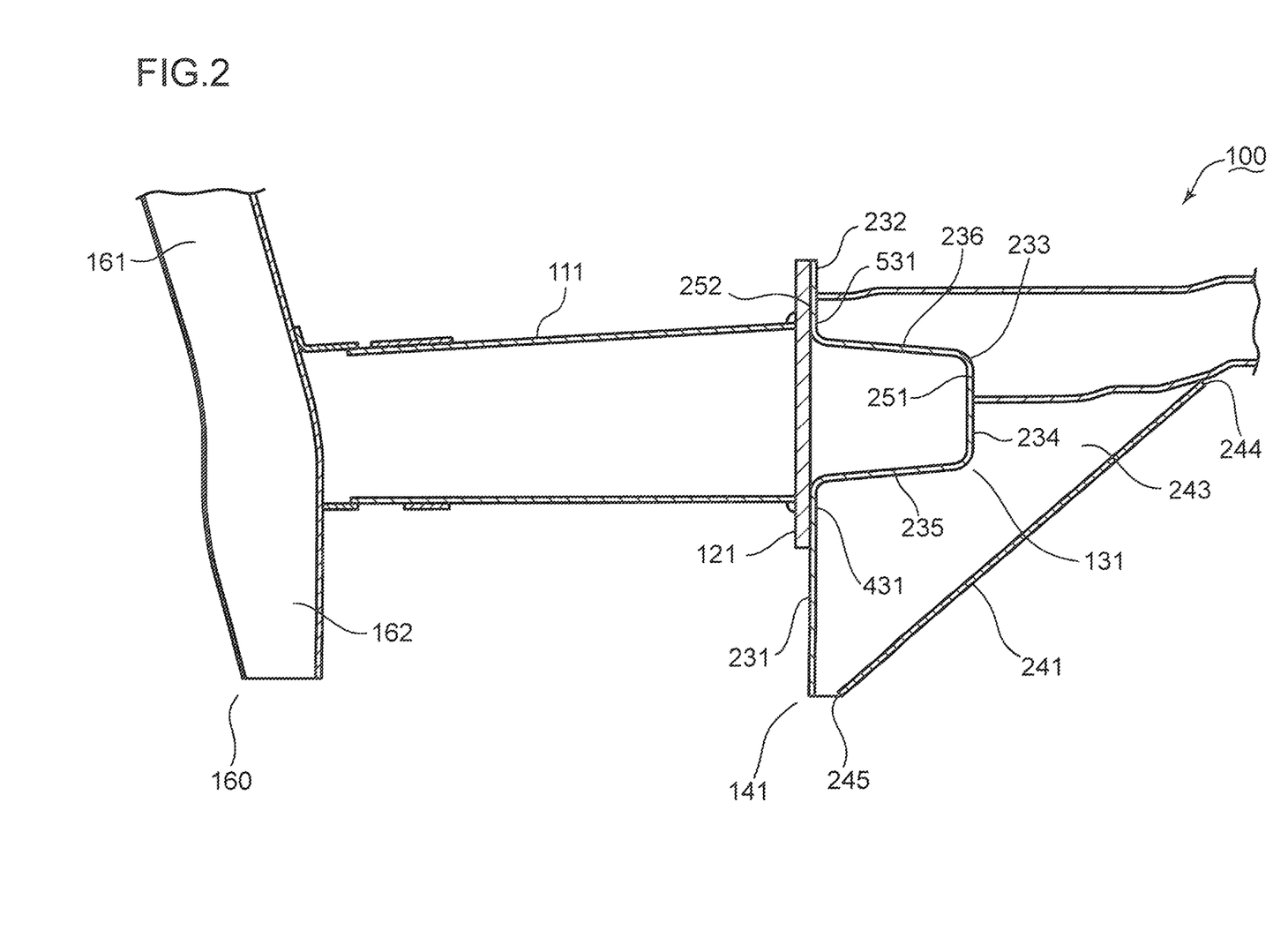
FIG. 2 is an enlarged horizontal cross-sectional view of the sub-frame shown in FIG. 1.
Figure 3:
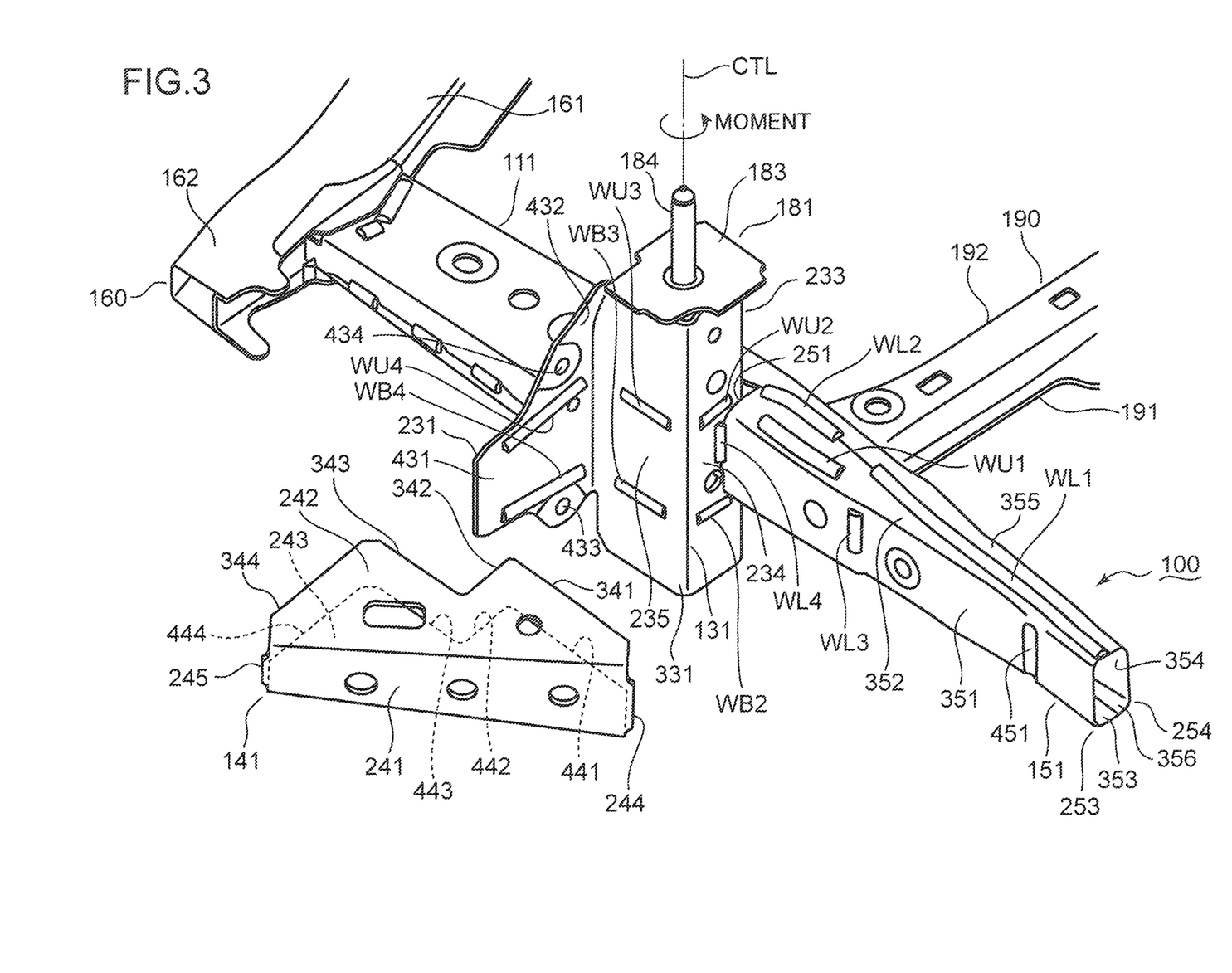
FIG. 3 is a schematic exploded perspective view of the sub-frame shown in FIG. 1.

FIG. 2 is an enlarged horizontal cross-sectional view of the sub-frame 100. FIG. 3 is a schematic exploded perspective view of the sub-frame 100. The sub-frame 100 is further described with reference to FIGS. 1 to 3.

As shown in FIG. 2, the pillar member 131 includes a left support plate portion 231, a right support plate portion 232 and a pillar portion 233. The left support plate portion 231 is away leftward from the right support plate portion 232. Front surfaces of the left and right support plate portions 231, 232 are aligned with one imaginary vertical plane (not shown). The set plate 121 comes into contact with the front surfaces of the left and right support plate portions 231, 232. The set plate 121 is fixed to the left and right support plate portions 231, 232 by screws or other appropriate fixing tools. Consequently, the crash can 111 connected to the set plate 121 is supported by the left and right support plate portions 231, 232. With regard to the present embodiment, the inner support plate portion is exemplified by the right support plate portion 232. The outer support plate portion is exemplified by the left support plate portion 231.

As shown in FIG. 2, the pillar portion 233 is formed from a thin plate having a horizontal cross-section bulging rearward from a right edge of the left support plate portion 231 and a left edge of the right support, plate portion 232. As shown in FIG. 3, the pillar portion 233 projects upward from the front side member 151 and the projecting member 141.

Figure 4:
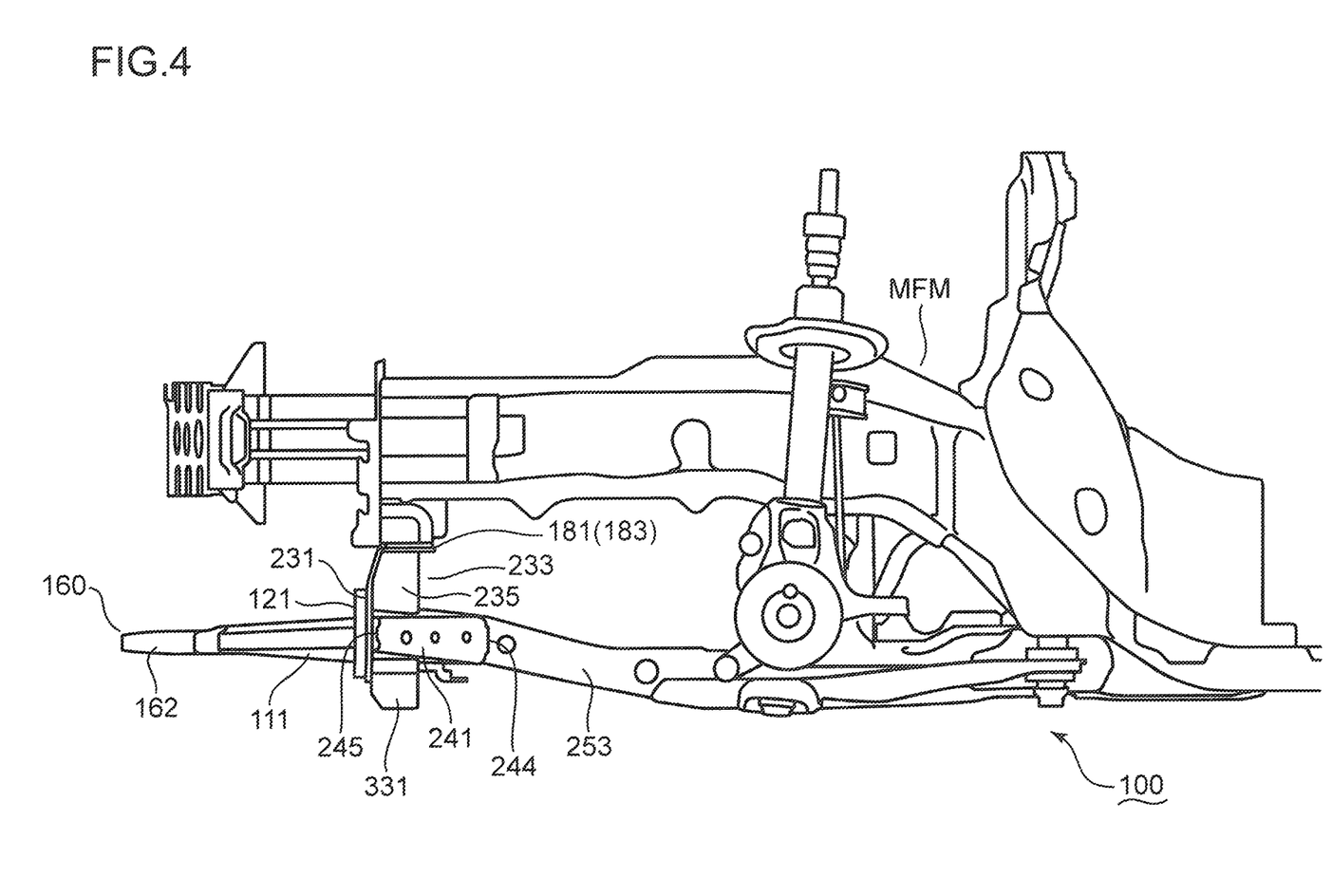
FIG. 4 is a schematic side view of the sub-frame shown in FIG. 1.

FIG. 4 is a schematic side view of the sub-frame 100. The sub-frame 100 is described with reference to FIGS. 1 to 4.

As shown in FIG. 2, the pillar portion 233 includes a rear wall 234, a left wall 235 and a right wall 236. The rear wall 234 extends vertically on the rear side of the left and right support plate portions 231, 232. The left wall 235 is bent on the right edge of the left support plate portion 231 and a left edge of the rear wall 234, and extends vertically between the left support plate portion 231 and the rear wall 234. The right wall 236 is bent on the left edge of the right support plate portion 232 and a right edge of the rear wall 234, and extends vertically between the right support plate portion 232 and the rear wall 234.

As shown in FIG. 3, the connection member 181 is welded to an upper end of the pillar portion 233. The connection member 181 includes a base plate 183 and a connection pin 184. The base plate 183 is welded to an upper end edge of the left wall 235, an upper end edge of the right, wall 236 (c.f. FIG. 2) and an upper end edge of the rear wall 234. The connection pin 184 is a round bar member projecting upward from an upper surface of the base plate 183. FIG. 3 shows a centerline CTL of the connection pin 184. When the SOL collision occurs, a rotational moment is generated around the centerline CTL.

FIG. 4 shows a main frame MFM. The main frame MFM is situated above the sub-frame 100. The connection members 181, 182 described with reference to FIG. 1 are engaged in a lower surface of the main frame MFM together with the connection pins 171, 172, 173. Consequently, the sub-frame 100 is connected to the main frame MFM. With regard to the present embodiment, the vehicle body is exemplified by the main frame MFM.

Figure 5:
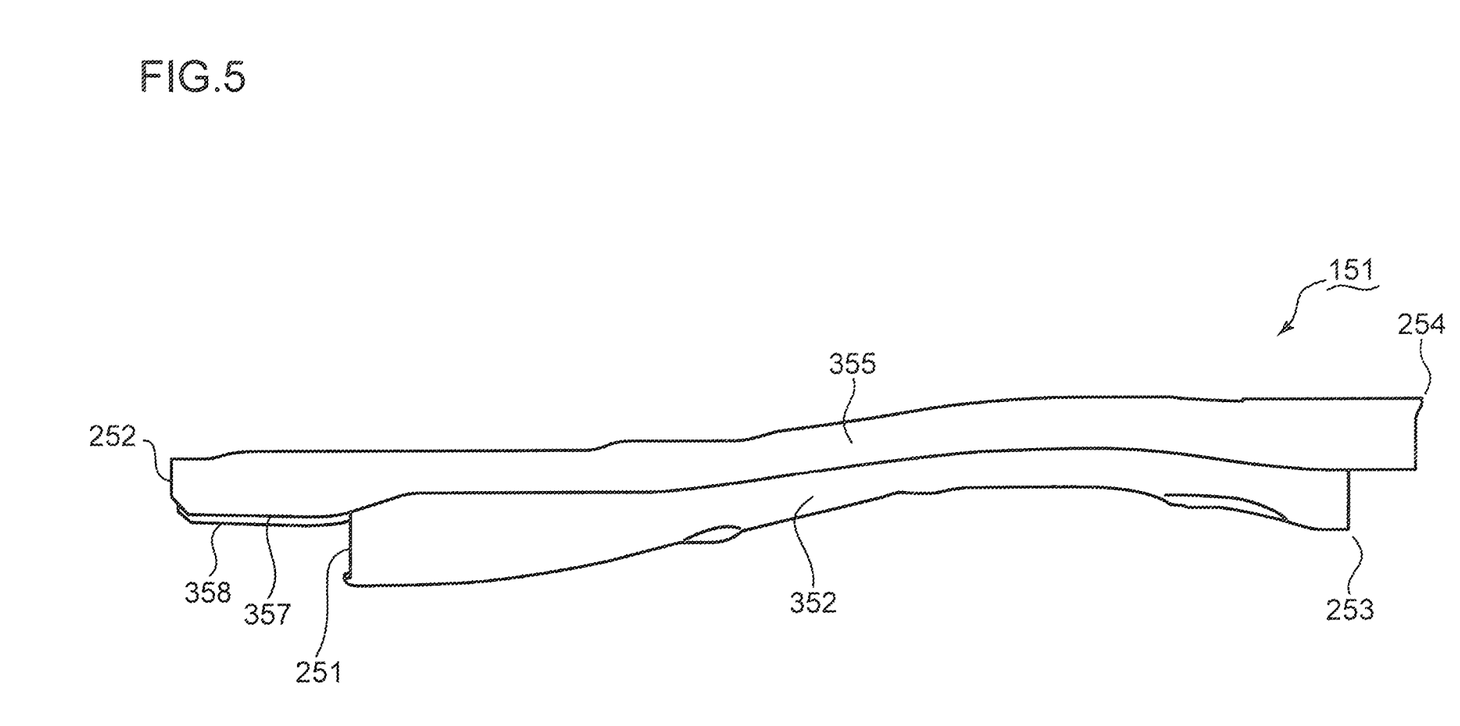
FIG. 5 is a schematic plan view of a front side member of the sub-frame shown in FIG. 1.

FIG. 5 is a schematic plan view of the front side member 151. The sub-frame 100 is described with reference to FIGS. 1 to 5.

As shown in FIG. 5, the front side member 151 includes a left front end 251 and a right front end 252. The right front end 252 is situated on the front side of the left front end 251.

As shown in FIGS. 2 and 3, the left front end 251 is abutted against the rear wall 234, and overlaps a substantially right half surface of a lower portion of the rear wall 234. The right front, end 252 is abutted against a rear surface of the right support plate portion 232, and is welded to the right, support plate portion 232. The right support plate portion 232 is interposed between the right-front end 252 and the set plate 121. With regard to the present embodiment, the outer front end is exemplified by the left front end 251. The inner front end is exemplified by the right front end 252.

The left front end 251 is welded to the right side with respect to an intermediate position of the rear wall 234 in the vehicle width direction. Therefore, unlike a conventional art, the left front end 251 does not project leftward from a left edge of the rear wall 234. Accordingly, even when the front side member 151 extends rearward substantially straight from the left and right front ends 251, 252, the steering space described with reference to FIG. 1 becomes sufficiently large.

Since the front side member 151 extends rearward substantially straight from the left and right front ends 251, 252, an impact force acting on the crash can 111 is transmitted rearward substantially straight along the front side member 151 without concentrating on a part of the front side member 151. Therefore, the front side member 151 is less likely to be deformed by the impact force acting on the crash can 111.

As shown in FIG. 5, the front side member 151 includes a left panel 253 and a right panel 254. The left panel 253 forms the aforementioned left front end 251. The right panel 254 forms the aforementioned right front end 252. The left panel 253 extends rearward substantially straight from the left front end 251. The right panel 254 extends rearward substantially straight, from the right front end 252.

As shown in FIG. 3, the left panel 253 has a. U-shaped cross-section. The left panel 253 includes a left wall portion 351, an upper wall portion 352 and a lower wall portion 353. The left wall, portion 351 faces the left front wheel (not shown), and forms a boundary of the steering space (c.f. FIG. 1). The upper wall portion 352 is bent rightward from an upper edge of the left wall portion 351. The lower wall portion 353 is bent rightward from a lower edge of the left wall portion 351.

As shown in FIG. 3, the right panel 254 has a U-shaped cross-section. The right panel 254 includes a right wall portion 354, an upper wall portion 355 and a lower wall portion 356. The right wall portion 354 is opposite to the left wall portion 351. The upper wall portion 355 is bent leftward from an upper edge of the right wall portion 354. The lower wall portion 356 is bent leftward from a lower edge of the right wall portion 354.

FIG. 3 shows welding lines WL1, WL2. A right edge of the upper wall portion 352 of the left panel 253 is welded to a left edge of the upper wall portion 355 of the right panel 254 along the welding lines WL1, WL2. Likewise, a right edge of the lower wall portion 353 of the left panel 253 is welded to a left edge of the lower wall portion 356 of the right panel 254. Consequently, a hollow rod member is formed, the hollow rod being used as the front side member 151.

The hollow rod formed by the left and right panels 253, 254 has a large size in the vertical direction than the vehicle width direction. Since the front side member 151 is narrow in the vehicle width direction but is wide in the vertical direction, the front side member 151 may have a large rigidity.

It is possible to form the left and right panels 253, 254, each of which has a U-shaped cross-section, from high-tensile steel plates having tensile strengths exceeding 480 MPa. Therefore, the front side member 151 may be rigid enough to withstand an impact force acting on the crash can 111.

As shown in FIG. 5, the right panel 254 includes joining edges 357, 358 which extend forward beyond the left front end 251 of the left panel 253. The joining edge 357 is a part of a left edge of the upper wall portion 355 of the right panel 254. The joining edge 358 situated below the joining edge 357 is a part of a left edge of the lower wall portion 356 (c.f. FIG. 3) of the right panel 254. The joining edges 357, 358 are welded to the right wall 236 of the pillar member 131 described with reference to FIG. 2.

As shown in FIG. 3, the projecting member 141 includes a slant plate portion 241, an upper plate portion 242 and a lower plate portion 243. The slant plate portion 241 includes a rear end edge 244 and a front end edge 245 opposite to the rear end edge 244. The slant plate portion 241 extends obliquely leftward and forward from the rear end edge 244 toward the front end edge 245.

FIG. 3 shows a welding line WL3 situated on the rear side of the left front, end 251. The rear, end edge 244 is welded to the left wall portion 351 of the left panel 253 along the welding line WL3. As shown in FIG. 2, the front end edge 245 is situated immediately behind a left end of the left support plate portion 231.

The upper plate portion 242 is a substantially horizontal plate portion bent from an upper edge of the slant plate portion 241. The upper plate portion 242 includes a first, edge 341, a second edge 342, a third edge 343 and a fourth edge 344. The first edge 341 extends along the upper wall portion 352 of the left panel 253. The second edge 342 is bent from a front end of the first edge 341 to extend leftward. The third edge 343 is bent from a left end of the second edge 342 to extend forward. The fourth edge 344 is bent from a front end of the third edge 343 to extend leftward.

FIG. 3 shows welding lines WU1, WU2, WU3, WU4. The first edge 341 is welded to the upper wall portion 352 of the left panel 253 along the welding line WU1, which is formed in a section from the welding line WL3 to the left front end 251 on the upper wall portion 352 of the left panel 253. The second edge 342 is welded to the rear wall 234 along the welding line WU2 extending substantially horizontally on the rear wall 234 of the pillar member 131. The third edge 343 is welded to the left wall 235 on the welding line WU3 extending substantially horizontally on the left wall 235 of the pillar member 131. The fourth edge 344 is welded to the left support plate portion 231 along the welding line WU4 extending substantially horizontally on the left support plate portion 231 of the pillar member 131.

The lower plate portion 243 is a substantially horizontal plate portion bent from a lower edge of the slant plate portion 241. The lower plate portion 243 includes a first edge 441, a second edge 442, a third edge 443 and a fourth edge 444. The first edge 441 of the lower plate portion 243 is substantially in parallel to the first edge 341 of the upper plate portion 242. The first edge 441 of the lower plate portion 243 is welded to the lower wall portion 353 of the left panel 253. The second edge 442 of the lower plate portion 243 is bent from a front end of the first edge 441 of the lower plate portion 243 to extend substantially in parallel to the second edge 342 of the upper plate portion 242. The third edge 443 of the lower plate portion 243 is bent from a left end of the second edge 442 of the lower plate portion 243 to extend substantially in parallel to the third edge 343 of the upper plate portion 242. The fourth edge 444 of the lower plate portion 243 is bent from a front end of the third edge 443 of the lower plate portion 243 to extend substantially in parallel to the fourth edge 344 of the upper plate portion 242.

FIG. 3 shows welding lines WB2, WB3, WB4. The second edge 442 of the lower plate portion 243 is welded to the rear wall 234 along the welding line WB2 extending substantially horizontally on the rear wall 234 of the pillar member 131. The third edge 443 of the lower plate portion 243 is welded to the left wall 235 along the welding line WB3 extending substantially horizontally on the left wall 235 of the pillar member 131. The fourth edge 444 of the lower plate portion 243 is welded to the left, support plate portion 231 along the welding line WB4 extending substantially horizontally on the left support plate portion 231 of the pillar member 131.

FIG. 3 shows a welding line WL4 between the welding lines WU2, WB2. The welding lines WU2, WB2 extend substantially horizontally whereas the welding line WL4 extends substantially vertically. The left front end 251 of the left panel 253 is abutted against a right half surface of a lower portion of the rear wall 234, and is welded to the rear wall 234 of the pillar member 131 along the welding line WL4.

The welding line WL4 extends vertically at a substantially intermediate position of the rear wall 234 in the vehicle width direction. Therefore, the left front end 251 of the left panel 253 comes into contact with the right half surface of the lower portion of the rear wall 234 of the pillar member 131. Right ends of the welding lines WU2, WB2 are situated on a vertical line of the welding line WL4. Therefore, the projecting member 141 covers a left half surface of the lower portion of the rear wall 234 of the pillar member 131. With regard to the present embodiment, the first area is exemplified by the right half surface of the lower portion of the rear wall 234. The second area is exemplified by the left half surface of the lower portion of the rear wall 234.

As described above, since the front end edge 245 is situated immediately behind a left end of the left, support plate portion 231 and the fourth edges 344, 444 of the upper and lower plate portions 242, 243 are welded along the welding lines WU4, WB4 extending substantially horizontally on the left support plate portion 231, a front end of the projecting member 141 is entirely covered by the left support plate portion 231.

As shown in FIG. 1, the bumper beam 160 includes a middle area 161, a left end portion 162 and a right end portion 163. The middle area 161 is a portion between the crash cans 111, 112. The left end portion 162 is a portion which projects leftward from the left crash can 111. The right end portion 163 is a portion which projects rightward from the right crash can 112. When the automobile collides with an object in the middle area 161, the crash cans 111, 112 are compressively deformed. Consequently, an impact force is effectively absorbed by the crash cans 111, 112. An impact force which fails to be absorbed by the crash cans 111, 112 is transmitted to the support structure 170 through the front side members 151, 152. As described above, since the front side members 151, 152 extend rearward substantially straight from the pillar members 131, 132, the front side members 151, 152 are hardly deformed by the impact force which fails to be absorbed by the crash cans 111, 112. Therefore, the impact force which fails to be absorbed by the crash cans 111, 112 is eventually concentrated on the connection pins 171, 172, 173. Consequently, the connection pins 171, 172, 173 are destroyed, so that the sub-frame 100 is separated from the main frame MFM (c.f. FIG. 4). Therefore, the impact force which fails to be absorbed by the crash cans 111, 112 is hardly transmitted to the cabin.

When the automobile collides with an object on the left end portion 162 of the bumper beam 160 (i.e. the SOL collision occurs), the crash can 111 is hardly deformed. In this case, the collision object which collides with the automobile hits with the left, support plate portion 231 after the left end portion 162 of the bumper beam 160 is destroyed. Consequently, the collision object directly acts on the pillar member 131 as a force for turning the pillar member 131. Accordingly, as shown in FIG. 3, a moment is generated around the centerline CTL.

As described above, since the projecting member 141 is welded to the pillar member 131, the moment around the centerline CTL acts as a force for turning the projecting member 141 around the centerline CTL. Consequently, the rear end edge 244 of the projecting member 141 is strongly pressed against the left wall portion 351 of the left panel 253 of the front side member 151. Since the front side member 151 is bent rightward and is eventually folded, an impact force caused by collision on the left end portion 162 of the bumper beam 160 is hardly transmitted to the cabin. Therefore, the sub-frame 100 effectively protects the cabin from the impact force caused by collision on the left end portion 162 of the bumper beam 160.

As shown in FIG. 3, a vertically extending shallow groove 451 may be formed in the left wall portion 351 of the left panel 253 of the front side member 151. Forming the shallow groove 451 makes it possible to specifically thin the left wall portion 351 at a portion where the shallow groove 451 is formed. In short, the left wall portion 351 becomes more fragile at a formation portion of the shallow groove 451 than other parts of the front side member 151.

As shown in FIG. 3, the shallow groove 451 is situated on the rear side of the welding line WL3 along which the rear end edge 244 of the projecting member 141 is welded. As described above, when the SOL collision occurs, the rear end edge 244 of the projecting member 141 presses the left wall portion 351 rightward. Since the front end of the front side member 151 is fixed to the pillar member 131 and a rear end of the front side member 151 is connected to the support structure 170 (c.f. FIG. 1), the front, side member 151 is flexurally deformed rightward when the rear end edge 244 of the projecting member 141 presses the left wall portion 351 rightward. Since the left wall portion 351 is specifically fragile at the shallow groove 451 and the shallow groove 451 is rearward away from the welding line WL3, the left wall portion 351 is largely flexed and deformed at the shallow groove 451. Therefore, the left wall portion 351 may not withstand a stress caused by the rightward flexural deformation of the front side member 151, and causes elastic deformation or destructive deformation at the shallow groove 451. Since a destruction pattern of the front side member 151 when the SOL collision occurs is substantially determined by the shallow groove 451, a designer may determine a position of the shallow groove 451, with taking account of a layout of various elements (e.g. an engine and a radiator) which are situated in a front portion of the automobile.

With regard to the present embodiment, the fragile portion, is formed by the shallow groove 451. However, the fragile portion may have another structure. For example, a through-hole may be formed in place of the shallow groove 451. Alternatively, another structure for causing a local change in rigidity may be formed in place of the shallow groove 451. The principles of the present embodiment are not limited to a specific structure for forming the fragile portion.

<Other Features>

A designer may provide various features to the aforementioned layout structure. The following features do not limit the design principles described in the context of the aforementioned embodiment.

(Thickness of Set Plate)

As shown in FIG. 2, the set plate 121 may be thicker than each of the left and right support plate portions 231, 232. Consequently, since the set plate 121 becomes highly rigid by itself, a rear end of the crash can 111 is welded to the highly rigid portion. When an impact force caused by collision in the middle area 161 of the bumper beam 160 is small, only the crash can 111 is deformed, so that the set plate 121 as well as the pillar member 131, the projecting member 141 and the front side member 151 on the rear side of the set plate 121 are less likely to be deformed.

In addition, a distance between the left support plate portion 231 (and the left wall 235) and the right support plate portion 232 (and the right wall 236) is easily maintained by the set plate 121. Therefore, even when there is a collision, of the automobile in the middle area 161 of the bumper beam 160, the pillar member 131 is less likely to be deformed. In short, the pillar member 131 may have a high rigidity against an impact force generated in the middle area 161 of the bumper beam 160. Even when the pillar member 131 is angularly displaced around the centerline CTL by a moment (c.f. FIG. 3) generated when the SOL collision occurs, deformation of the pillar member 131 is less likely to occur. Consequently, a force for turning the pillar member 131 is efficiently transmitted to the projecting member 141. Accordingly, the projecting member 141 may highly reliably bend the front, side member 151 under the SOL collision.

(Pillar Member)

As shown in FIG. 4, the pillar portion 233 may include a downward projecting portion 331 which projects downward from a lower edge of the set plate 121. The downward projecting portion 331 may be defined as a portion below the welding lines WB2, WB3 described with reference to FIG. 3. The downward projecting portion 331 is a portion which is most likely to collide with an obstacle (e.g. a curb stone) below the sub-frame 100. In short, the downward projecting portion 331 may collide with an obstacle before a portion of the sub-frame 100 other than the downward projecting portion 331 collides with the obstacle. When the downward projecting portion 331 collides with an obstacle, a driver often perceives collision of the downward projecting portion 331 against the obstacle, and stops the automobile. Accordingly, damage or breakage of the sub-frame 100 is limited to the downward projecting portion 331.

As described above, the pillar member 131 is effectively reinforced by the set plate 121. Since a portion of the pillar member 131 above the downward projecting portion 331 is protected by the set plate 121, the portion of the pillar member 131 above the downward projecting portion 331 is less likely to be damaged by collision of the downward projecting portion 331 against the obstacle. In short, the set plate 121 may effectively prevent damage or breakage of the portion of the pillar member 131 above the downward projecting portion 331.

(Connection Structure between Pillar Member and Set Plate)

As shown in FIG. 3, the left support plate portion 231 includes a lower portion 431 forming an area below the welding line WU4 and an upper portion 432 forming an area above the welding line WU4. The upper portion 432 forms an area which is tapered toward the connection member 181. A through-hole 433 is formed in the lower portion 431. The through-hole 433 is situated below the welding line WB4. A through-hole 434 is formed in the upper portion 432. With regard to the present embodiment, the second lower portion is exemplified by the lower portion 431. The second upper portion is exemplified by the upper portion 432.

Like the left support plate portion 231, the right support plate portion 232 includes a lower portion 531 (c.f. FIG. 2) and an upper portion 532 (c.f. FIG. 1). The lower portion 531 of the right support plate portion 232 forms an area against which the right front end 252 (c.f. FIG. 5) of the front side member 151 is abutted. Like the lower portion of the left support plate portion 231, a through-hole (not shown) is formed, in each of the lower and upper portions 531, 532 of the right support plate portion 232. The through-hole formed in the lower portion 531 of the right support plate portion 232 is situated below the right front end 252 of the front side member 151. With regard to the present embodiment, the first lower portion is exemplified by the lower portion 531. The first upper portion is exemplified by the upper portion 532.

As shown in FIG. 2, a rear end of the crash can 111 is welded to the set plate 121 between the lower portions 431, 531 of the left and right support plate portions 231, 232. The through-hole 433 formed in the lower portion 431 of the left support plate portion 231 is away obliquely leftward and downward from a welding position between the crash can 111 and the set plate 121. The through-hole 434 formed in the upper portion 432 of the left support plate portion 231 is away obliquely leftward and upward from a welding position between the crash can 111 and the set plate 121. The through-hole formed in the lower portion 531 of the right support plate portion 232 is away obliquely rightward and downward from a welding position between the crash can 111 and the set plate 121. The through-hole formed in the upper portion 532 of the right support plate portion 232 is away obliquely rightward and upward from a welding position between the crash can 111 and the set plate 121. Four through-holes (not shown) in correspondence with the through-holes 433, 434 of the left support plate portion 231 and the two through-holes of the right support plate portion 232 are formed in the set plate 121. Two screws extend through the set plate 121, and are inserted in the through-holes 433, 434 formed in the left support plate portion 231. Likewise, other two screws extend through the set plate 121, and are inserted in the two through-holes formed in the right support plate portion 232. Therefore, the set plate 121 is fastened to the left and right support plate portions 231, 232 at a position sufficiently away from a connection position between the set plate 121 and a rear end of the crash can 111. Consequently, the crash can 111 is stably held by the set plate 121 and the pillar member 131.

(Cross Member)

With regard to the aforementioned embodiment, the front side member is welded to the pillar member at art inwardly off-centered position in the vehicle width direction. Therefore, a force for displacing the front side member inward is likely to be generated even when collision occurs in the middle area of the bumper beam. The front chassis structure may include a cross member which resists against a force for displacing the front side member inward. An exemplificative cross member is described below.

Figure 6:
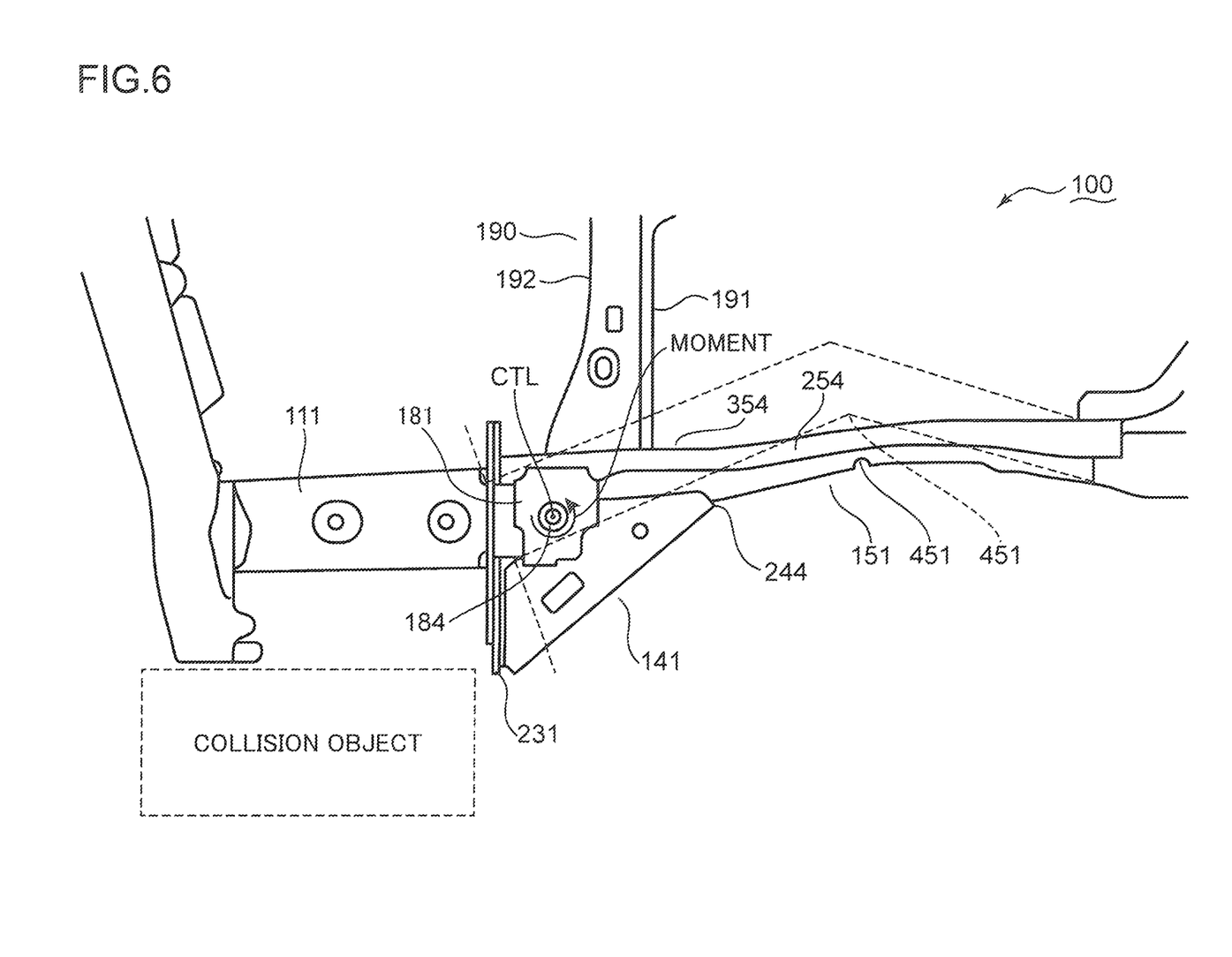
FIG. 6 is a schematic plan view of a part of the sub-frame shown in FIG. 1.

FIG. 6 is a schematic plan view of a part of the sub-frame 100. The sub-frame 100 is further described with reference to FIGS. 1 and 6. The dotted line shown, in FIG. 6 means the front side member 151 deformed by the SOL collision.

As shows in FIG. 1, the sub-frame 100 includes a cross member 190 extending between the front side members 151, 152. The cross member 190 includes a rear edge 191 and a front edge 192. Each of the rear and front edges 191, 192 extends in the vehicle width direction.

As shown in FIGS. 1 and 6, the rear edge 191 extends straight whereas the front edge 192 is curved forward near the front side member 151 as shown in FIG. 6. Since the cross member 190 is thickened near the front side member 151, a long welding length is obtained between the cross member 190 and the right panel 254 of the front side member 151.

As shown in FIG. 6, a left end of the rear edge 191 of the cross member 190 is connected to the right wall portion 354 of the right panel 254 of the front side member 151 between the centerline CTL of the connection pin 184 and the rear end edge 244 of the projecting member 141 in the vehicle front-rear direction. The projecting member 141 transmits a load acting on the front chassis structure 100 by the SOL collision from, a position on the pillar member 131 in the rear side of the left support plate portion 231 to a position which is rearward of the connection member 181 and outside of the front side member 151 in the vehicle width direction (an outer lateral surface of the front side member 151 on the front side of the shallow groove 451). Consequently, the front side member 151 receives a force for bending the front side member rightward from the rear end edge 244 of the projecting member 141. Since the rear edge 191 of the cross member 190 is situated on the front side of the rear end edge 244 of the projecting member 141 which causes a force for bending the front side member 151 rightward when the SOL collision occurs, bending (c.f. the dotted line in FIG. 6) at the shallow groove 451 formed on the rear side of the rear end edge 244 of the projecting member 141 is hardly prevented by the cross member 190.

As shown in FIG. 3, since the front, side member 151 is attached to the pillar member 131 disproportionally rightward, the front end of the front side member 151 is likely to receive a rightward acting force when a frontal collision occurs, the frontal collision causing compression of the crash can 111. Since the cross member 190 resists against, the rightward acting force, the front side member 151 is hardly deformed rightward. Therefore, a force which fails to be absorbed by the crash can 111 is smoothly transmitted to the support structure 170 through the front side member 151.

The aforementioned various features may be combined or modified to meet an overall design of various vehicles.

With regard to the aforementioned embodiment, joining between the projecting member, the front side member, and the pillar member depends on welding techniques. However, other techniques (e.g. using a rivet or a screw) may be used in combination with welding or in place of welding.

With regard to the aforementioned embodiment, the connection member of the sub-frame projects toward the main frame, and is connected to the main frame. However, the connection member of the sub-frame may be a plate-shaped member including a through-hole or a recess portion for receiving a rod member projecting downward from the main frame. The principles of the aforementioned embodiment are not limited by a specific structure or a specific shape of the connection member.

The front chassis structure described in the context of the aforementioned embodiment mainly includes the following features.

A front chassis structure according to one aspect of the aforementioned embodiment includes an impact, absorber for absorbing an impact force and a set plate connected to the impact absorber. The front chassis structure includes: a pillar member having an inner support plate portion, on which the set plate is attached to support the impact absorber, an outer support plate portion, on which the set plate is attached, to support the impact absorber at a position away outward in a vehicle width direction of the automobile from the inner support plate portion, and a pillar portion having a horizontal cross-section bulging rearward from the inner and outer support plate portions and extending in a vertical, direction; a connection member attached to an upper end of the pillar portion and connected to a vehicle body above the front chassis structure; a front side member extending rearward from the pillar member; and a projecting member connected to the pillar member and projecting outward in the vehicle width direction from the pillar member. The projecting member includes a front end covered by the outer support plate portion. The projecting member is connected to the front side member so that the projecting member presses the front side member inward in the vehicle width direction when there is a moment around the connection member, the moment being generated when the projecting member collides with a collision object which collides with the automobile.

According to the aforementioned configuration, since the set plate connected to the impact absorber for absorbing an impact force is attached between the inner support plate portion of the pillar member and the outer support plate portion for supporting the impact absorber at a position away outward in the vehicle width direction of the automobile from the inner support plate portion, deformation which may cause a change in distance between the inner and outer support plate portions is less likely to happen to the pillar member. In addition, since the pillar portion of the pillar member has a horizontal cross-section bulging rearward from the inner and outer support plate portions, the pillar member may be rigid enough to withstand a large impact force.

Since the connection member is attached to the upper end of the pillar portion extending in the vertical direction, the front chassis structure is appropriately connected to the vehicle body situated above the front chassis structure.

Since the projecting member is connected to the pillar member so as to project outward in the vehicle width direction from the pillar member, a collision object may collide with the outer support plate portion for covering the front end of the projecting member, under which the impact absorber may not effectively absorb an impact force. Since the impact force directly acts on the pillar member, a moment around the connection member attached to the upper end of the pillar portion is appropriately generated. Since the moment around the connection member acts as a force for turning the projecting member connected to the pillar member so as to extend rearward from the pillar member, the projecting member may press the front side member in the vehicle width direction so as to bend the front side member. Consequently, a cabin is appropriately protected from the impact force.

Since the projecting member is not connected to the set plate but is connected to the pillar member, it is not necessary to prepare a plurality of set plates. Therefore, the front chassis structure may be easily manufactured.

With regard to the aforementioned configuration, the set plate may be thicker than each of the inner and outer support plate portions.

According to the aforementioned, configuration, since the set plate is thicker than each of the inner and outer support plate portions, deformation which may cause a change in distance between the inner and outer support plate portions is less likely to happen to the pillar member. In addition, since the set plate itself has a high rigidity, the impact absorber is connected to the highly rigid portion. Consequently, the impact absorber may effectively absorb the impact force. When an impact force acting on the impact absorber is not so large, deformation is less likely to happen to a portion situated on the rear side of the impact absorber (i.e. the set plate, the pillar member and the front side member) although the impact absorber is deformed.

With regard to the aforementioned configuration, the pillar portion may include a downward projecting portion which projects downward from the set plate.

According to the aforementioned configuration, since the downward projecting portion projects downward from the set plate, the downward projecting portion is most likely in the front chassis structure to collide with an obstacle below the front chassis structure. Therefore, the downward projecting portion may collide with the obstacle earlier than portions of the front chassis structure other than the downward projecting portion. Consequently, a driver may stop the automobile before the portions other than the downward projecting portion are broken or damaged. As described above, since the set plate is attached to the inner and outer support plate portions, deformation of the downward projecting portion is prevented by the set plate. Therefore, breakage or damage of the front chassis structure by the obstacle below the front chassis structure is less likely to spread over parts situated above the front chassis structure.

With regard to the aforementioned configuration, the pillar portion may include a rear wall situated on a rear side of the inner and outer support plate portions. The front side member may include an inner front end, which is abutted against the inner support plate portion, and an outer front end, which is abutted against the rear wall without being projected outward in the vehicle width direction from the rear wall.

According to the aforementioned configuration, since the front side member extends rearward from the pillar member, the front side member faces a front wheel of the automobile so as to form a boundary of a steering space for changing a direction of the front wheel. Since the inner front end of the front side member is abutted against the inner support plate portion while the outer front end of the front side member is abutted against the rear wall without being projected outward in the vehicle width direction from the rear wall, it is not necessary to curve the front side member inward by a large degree in the vehicle width direction in order to form a large steering space. Therefore, the front side member may withstand an impact force transmitted from the pillar member with little deformation.

With regard to the aforementioned configuration, the inner support plate portion may include a first lower portion, which is abutted against the inner front end, and a first upper portion extending upward from the inner front end. The outer support plate portion may include a second lower portion for covering the front end of the projecting member, and a second upper portion extending upward from the front end of the projecting member. The impact absorber may be a crash can, which is supported by the set plate and the pillar member between the first and second lower portions. The set plate may be connected to the first and second upper portions.

According to the aforementioned configuration, since the set plate is connected to the first and second upper portions, a connection position of the set plate to the pillar member may be sufficiently distant from the crash can which is supported by the set plate and the pillar member between the first and second lower portions. Consequently, the crash can is stably supported by the set plate and the pillar member.

With regard to the aforementioned configuration, the projecting member may include a rear end edge which is joined to the front side member on a rear side of the outer front end. The front side member may include a fragile portion, which is specifically fragile, the fragile portion being formed on a rear side of the rear end edge.

According to the aforementioned configuration, since the rear end edge of the projecting member is joined to the front side member on the rear side of the outer front end, the rear end edge presses the front side member inward in the vehicle width direction when a moment happens around the connection member. Since the fragile portion is situated on the rear side of the rear end edge, a stress caused by the pressing force from the rear end edge is concentrated on the fragile portion. Consequently, the front side member is bent by the projecting member at the fragile portion.

With regard to the aforementioned configuration, the front chassis structure may further include a cross member having a rear edge extending inward in the vehicle width direction from the front side member between a connection position of the vehicle body to the connection member and the rear end edge of the projecting member.

According to the aforementioned configuration, since the rear edge of the cross member extends inward in the vehicle width direction from the front side member between the connection position of the vehicle body to the connection member and the rear end edge, the front chassis structure may resist against a bending moment acting on the front side member. Therefore, the front side member withstands a strong impact force which may cause compressive deformation of the crash can, and is less likely to be bent. Under a SOL collision, the front side member is appropriately bent by a force transmitted from the projecting member since the rear edge of the cross member is situated on the front side of the rear end edge of the projecting member.

With regard to the aforementioned configuration, the rear wall may include a first area which is abutted against the outer front end, and a second area adjacent to the first area and covered by the projecting member.

According to the aforementioned configuration, since the first area of the rear wall is abutted against the outer front end while the second area adjacent to the first area is covered by the projecting member, the outer front end of the front side member is abutted against the rear wall without being projected outward in the vehicle width direction from the rear wall. Since it is not necessary to curve the front side member inward in the vehicle width direction by a large degree in order to form a large steering space, the front side member may withstand an impact force transmitted from the pillar member with little deformation.

INDUSTRIAL APPLICABILITY

The principles of the aforementioned embodiment are advantageously applied to a sub-frame which is mounted in various vehicles.

This application is based on Japanese Patent Application No. 2017-063125 filed on Mar. 28, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A front chassis structure of an automobile including an impact absorber for absorbing an impact force and a set plate connected to the impact absorber, comprising:
   a pillar member including an inner support plate portion, on which the set plate is attached to support the impact absorber, an outer support plate portion, on which the set plate is attached to support the impact absorber at a position away outward in a vehicle width direction of the automobile from the inner support plate portion, and a pillar portion having a horizontal cross-section bulging rearward from the inner and outer support plate portions, the pillar portion extending in a vertical direction;
   a connection member attached to an upper end of the pillar portion and connected to a vehicle body above the front chassis structure;
   a front side member extending rearward from the pillar member and connected to a rear surface of the pillar member; and
   a projecting member connected to the pillar member and projecting outward in the vehicle width direction from the pillar member,
   wherein the projecting member includes a front end covered by the outer support plate portion, and
   wherein a rear end of the projecting member is connected to the front side member on a rear side of the pillar member so that the projecting member presses the front side member inward in the vehicle width direction when there is a moment around the connection member, the moment being generated when the projecting member collides with a collision object which collides with the automobile.

2. The front chassis structure according to claim 1, wherein the set plate is thicker than each of the inner and outer support plate portions.

3. The front chassis structure according to claim 2, wherein the pillar portion includes a downward projecting portion which projects downward from the set plate.

4. The front chassis structure according to claim 2,
wherein the pillar portion includes a rear wall situated on a rear side of the inner and outer support plate portions, and
wherein the front side member includes an inner front end, which is abutted against the inner support plate portion, and an outer front end, which is abutted against the rear wall without being projected outward in the vehicle width direction from the rear wall.

5. The front chassis structure according to claim 1,
wherein the pillar portion includes a downward projecting portion which projects downward from the set plate.

6. The front chassis structure according to claim 5,
wherein the pillar portion includes a rear wall situated on a rear side of the inner and outer support plate portions, and
wherein the front side member includes an inner front end, which is abutted against the inner support plate portion, and an outer front end, which is abutted against the rear wall without being projected outward in the vehicle width direction from the rear wall.

7. The front chassis structure according to claim 1,
wherein the pillar portion includes a rear wall situated on a rear side of the inner and outer support plate portions, and
wherein the front side member includes an inner front end, which is abutted against the inner support plate portion, and an outer front end, which is abutted against the rear wall without being projected outward in the vehicle width direction from the rear wall, the outer front end of the front side member being connected to the rear wall of the pillar portion.

8. The front chassis structure according to claim 7,
wherein the inner support plate portion includes a first lower portion, which is abutted against the inner front end, and a first upper portion extending upward from the inner front end,
wherein the outer support plate portion includes a second lower portion, which covers the front end of the projecting member, and a second upper portion extending upward from the front end of the projecting member,
wherein the impact absorber is a crash can, which is supported by the set plate and the pillar member between the first and second lower portions, and
wherein the set plate is connected to the first and second upper portions.

9. The front chassis structure according to claim 8,
wherein the projecting member includes a rear end edge constituting the rear end of the projecting member, and
wherein the front side member includes a fragile portion which is specifically fragile, the fragile portion being formed on a rear side of the rear end edge.

10. The front chassis structure according to claim 9, further comprising:
a cross member including a rear edge extending inward in the vehicle width direction from the front side member between a connection position of the vehicle body to the connection member and the rear end edge of the projecting member.

11. The front chassis structure according to claim 10,
wherein the rear wall includes a first area which is abutted against the outer front end, and a second area adjacent to the first area and covered by the projecting member.

12. The front chassis structure according to claim 9,
wherein the rear wall includes a first area, which is abutted against the outer front end, and a second area adjacent to the first area and covered by the projecting member.

13. The front chassis structure according to claim 8,
wherein the rear wall includes a first area, which is abutted against the outer front end, and a second area adjacent to the first area and covered by the projecting member.

14. The front chassis structure according to claim 7,
wherein the projecting member includes a rear end edge which is joined to the front side member on a rear side of the outer front end, and
the front side member includes a fragile portion, which is specifically fragile, the fragile portion being formed on a rear side of the rear end edge.

15. The front chassis structure according to claim 14, further comprising:
a cross member including a rear edge extending inward in the vehicle width direction from the front side member between a connection position of the vehicle body to the connection member and the rear end edge of the projecting member.

16. The front chassis structure according to claim 15,
wherein the rear wall includes a first area, which is abutted against the outer front end, and a second area adjacent to the first area and covered by the projecting member.

17. The front chassis structure according to claim 14,
wherein the rear wall includes a first area, which is abutted against the outer front end, and a second area adjacent to the first area and covered by the projecting member.

18. The front chassis structure according to claim 7,
wherein the rear wall includes a first area, which is abutted against the outer front end, and a second area adjacent to the first area and covered by the projecting member.

19. A front chassis structure for an automobile including a crash can for absorbing an impact force and a set plate connected to the crash can, comprising:
a pillar member including an inner support plate portion, on which the set plate is attached to support the crash can, an outer support plate portion, on which the set plate is attached to support the crash can at a position away outward in a vehicle width direction of the automobile from the inner support plate portion, and a pillar portion having a horizontal cross-section bulging rearward from the inner and outer support plate portions, the pillar portion extending in a vertical direction;
a connection member attached to an upper end of the pillar portion and connected to a vehicle body above the front chassis structure;
a front side member extending rearward from the pillar member;
a projecting member connected to the pillar member and projecting outward in the vehicle width direction from the pillar member; and
a cross member including a rear edge extending inward in the vehicle width direction from the front side member,
wherein the projecting member is connected to the front side member so that the projecting member presses the front side member inward in the vehicle width direction when there is a moment around the connection member, the moment being generated when the projecting member collides with a collision object which collides with the automobile, wherein the set plate is thicker than each of the inner and outer support plate portions, wherein the pillar portion includes a downward projecting portion, which projects downward from the set plate, and a rear wall situated on a rear side of the inner and outer support plate portions, wherein the front side member includes an inner front end, which is abutted against the inner support plate portion, an outer front end, which is abutted against the rear wall without being projected outward in the vehicle width direction from the rear wall, and a fragile portion which is specifically fragile, wherein the projecting member includes a front end covered by the outer support plate portion, and a rear end edge which is joined to the front side member on a rear side of the outer front end, wherein the inner support plate portion includes a first lower portion, which is abutted against the inner front end, and a first upper portion extending upward from the inner front end, wherein the outer support plate portion includes a second lower portion, which covers the front end of the projecting member, and a second upper portion extending upward from the front end of the projecting member, wherein the crash can is supported by the set plate and the pillar member between the first and second lower portions, wherein the set plate is connected to the first and second upper portions, wherein the fragile portion is formed on a rear side of the rear end edge, wherein the cross member extends from the front side member between a connection position of the vehicle body to the connection member and the rear end edge of the projecting member, and wherein the rear wall includes a first area, which is abutted against the outer front end, and a second area adjacent to the first area and covered by the projecting member.

20. A front chassis structure of an automobile including an impact absorber for absorbing an impact force and a set plate connected to the impact absorber, comprising:

a pillar member including an inner support plate portion, on which the set plate is attached to support the impact absorber, an outer support plate portion, on which the set plate is attached to support the impact absorber at a position away outward in a vehicle width direction of the automobile from the inner support plate portion, and a pillar portion having a horizontal cross-section bulging rearward from the inner and outer support plate portions, the pillar portion extending in a vertical direction;

a connection member attached to an upper end of the pillar portion and connected to a vehicle body above the front chassis structure;

a front side member extending rearward from the pillar member; and a projecting member connected to the pillar member and projecting outward in the vehicle width direction from the pillar member, wherein the projecting member includes a front end covered by the outer support plate portion, wherein the projecting member is connected to the front side member so that the projecting member presses the front side member inward in the vehicle width direction when there is a moment around the connection member, the moment being generated when the projecting member collides with a collision object which collides with the automobile, wherein the pillar portion includes a rear wall situated on a rear side of the inner and outer support plate portions, and wherein the front side member includes an inner front end, which is abutted against the inner support plate portion, and an outer front end, which is abutted against the rear wall without being projected outward in the vehicle width direction from the rear wall.

* * * * *